July 1, 1958 G. E. GRONEMEYER 2,841,203
THERMAL INSULATION
Filed July 13, 1954 7 Sheets-Sheet 5

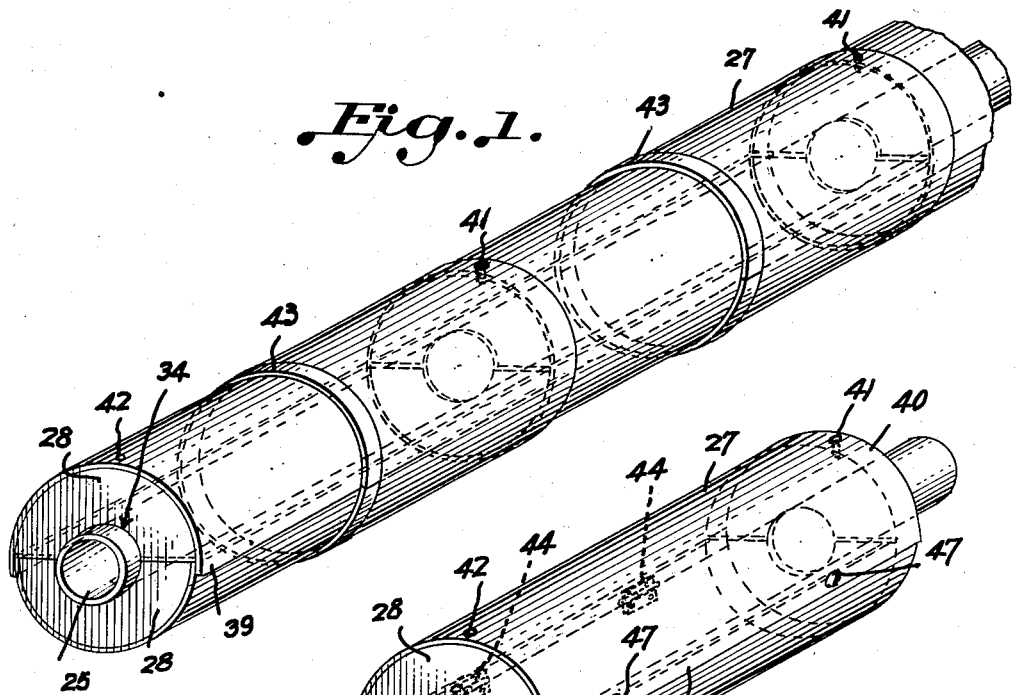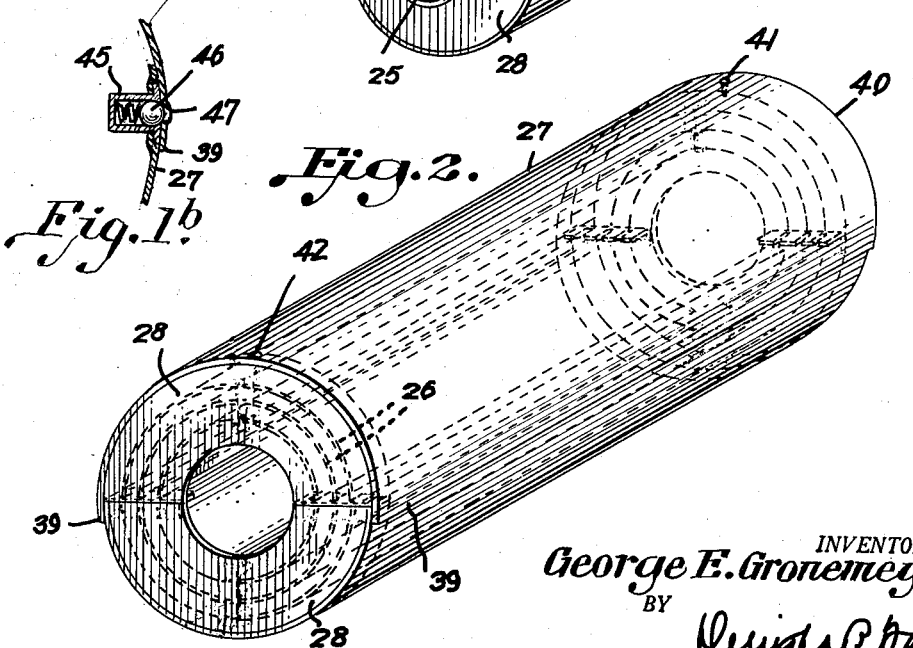

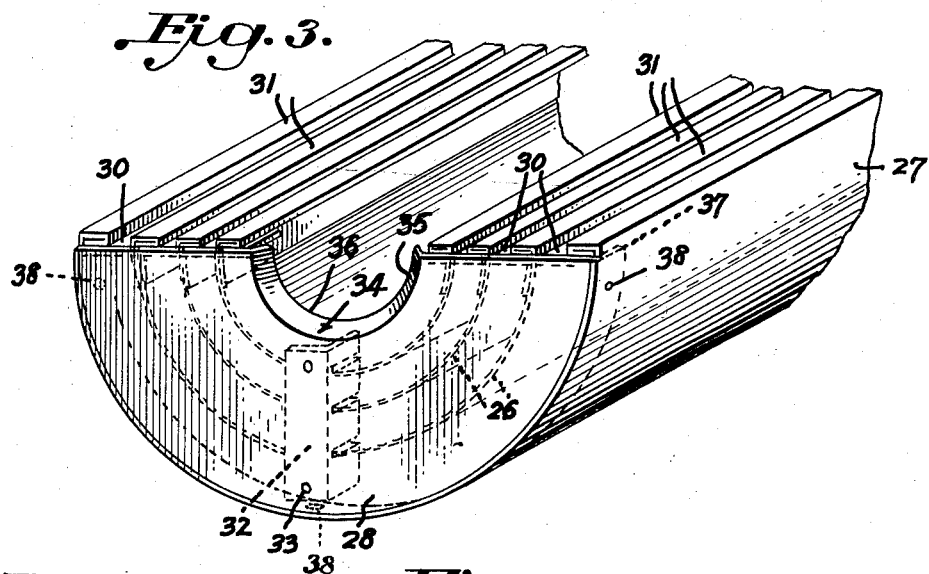
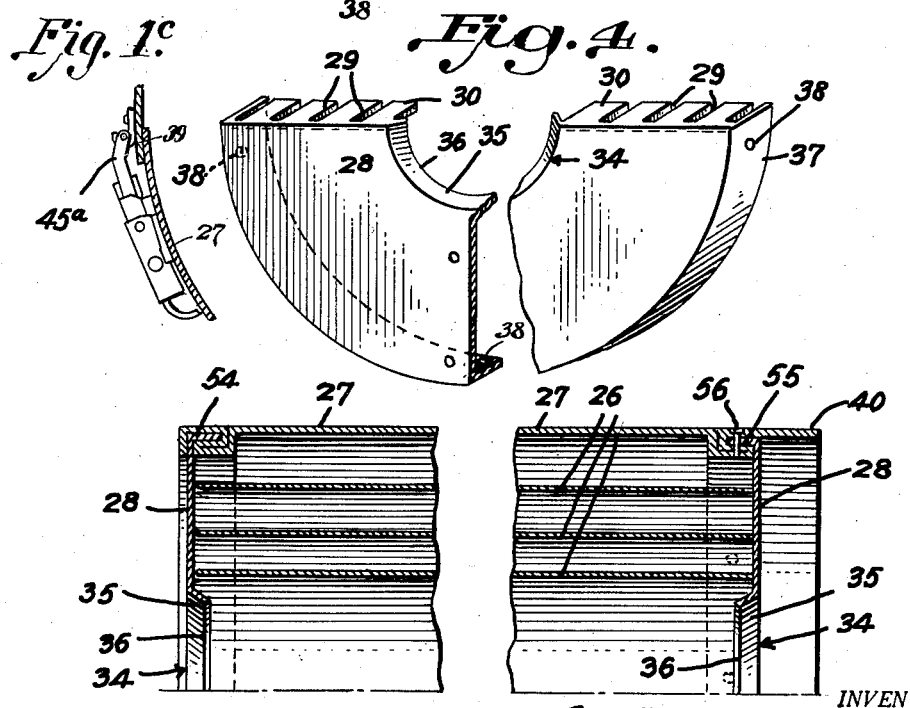

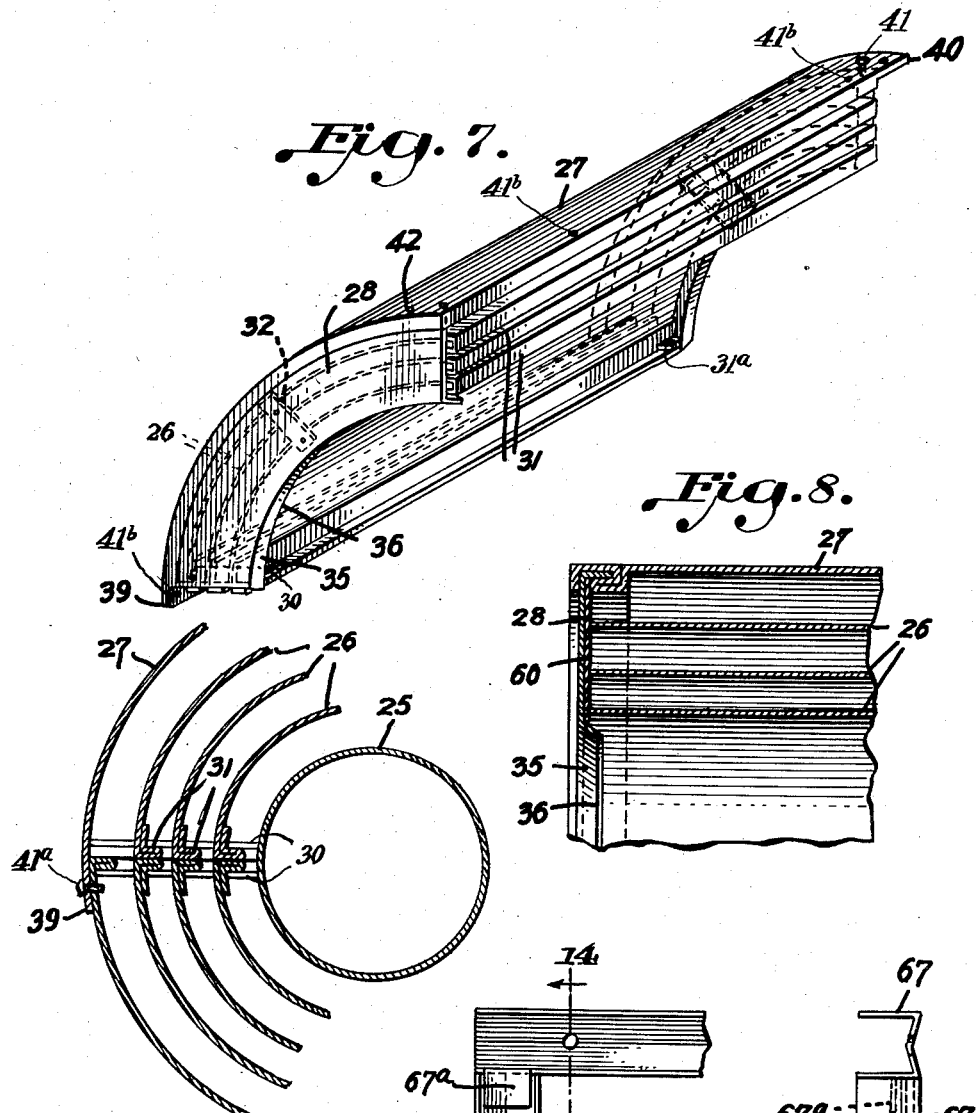

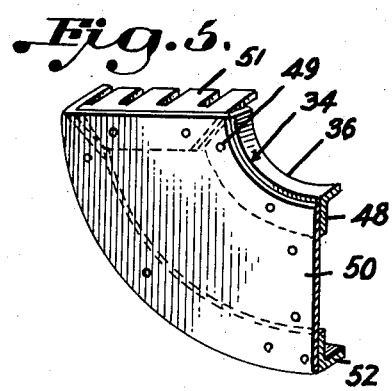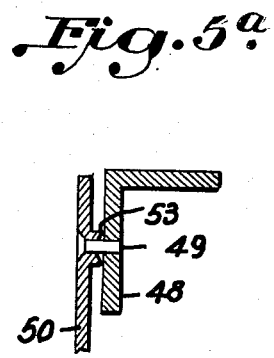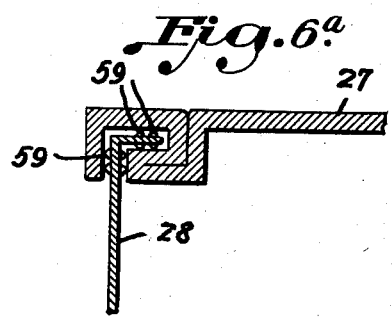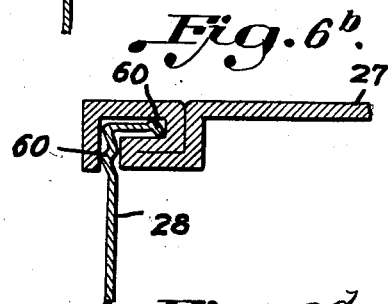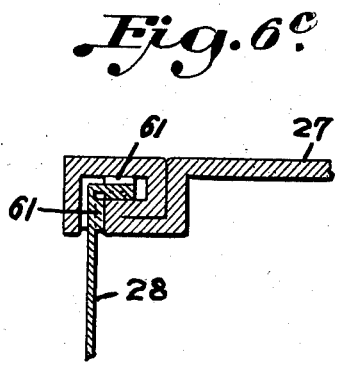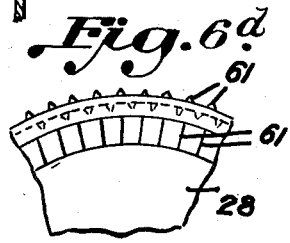

INVENTOR.
George E. Gronemeyer,
BY
Dwight R. Bau.
ATTY.

July 1, 1958    G. E. GRONEMEYER    2,841,203
THERMAL INSULATION
Filed July 13, 1954    7 Sheets-Sheet 6
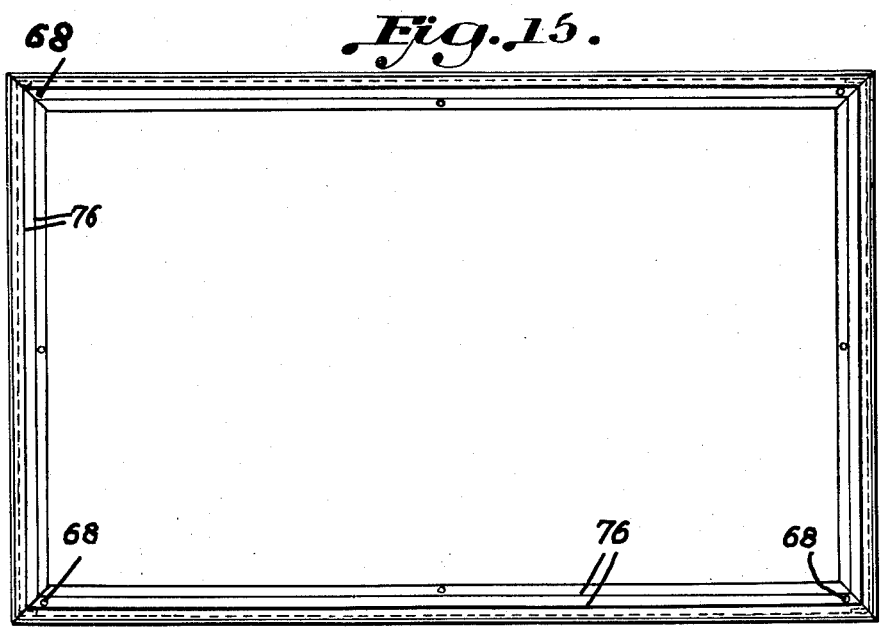
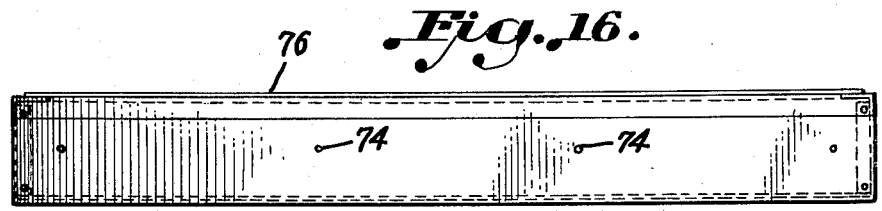
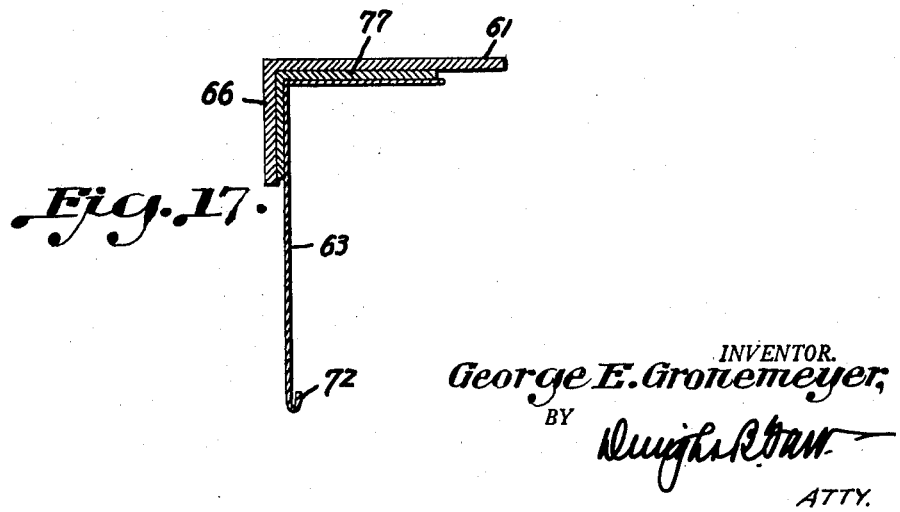
INVENTOR.
George E. Gronemeyer,
BY
ATTY.

July 1, 1958  G. E. GRONEMEYER  2,841,203
THERMAL INSULATION
Filed July 13, 1954  7 Sheets-Sheet 7

INVENTOR.
George E. Gronemeyer.
BY
ATTY.

United States Patent Office 2,841,203
Patented July 1, 1958

2,841,203

THERMAL INSULATION

George E. Gronemeyer, Morrisville, Pa., assignor to Mirror Insulation Company, Inc., Lambertville, N. J., a corporation of Delaware Application July 13, 1954, Serial No. 443,033

7 Claims. (Cl. 154—45)

This invention relates generally to thermal insulation such as is illustrated and described in Letters Patent of the United States No. 2,613,166 issued to me under date of October 7, 1952; the present invention aiming to materially improve the construction and assemblage of this particular type of installation to more adequately improve the insulation characteristics as well as to simplify the construction of the device as well as its method of application and maintenance in practice.

Thermal insulations of the prefabricated reflective type, such as disclosed in my above mentioned patent as well as in other constructions heretofore proposed, have certain disadvantages such as high price, inadequate life, lack of ruggedness sufficient for industrial use, cost in installation and maintenance as well as difficulty to remove, repair and/or replace. An outstanding reason for physical failure of some forms of reflective insulation structures heretofore proposed has been lack of structural strength due to the use of certain non-conductor insulating type materials as structural elements. These tend to embrittle and weaken after exposure to heat for a period of time, resulting in defective installation where non-metal supports and spacer materials of this character have been used to separate and hold the reflective metal insulating sheets in place. A further reason for failure of such previous reflective insulation is the lack of structural strength of the insulating unit as a whole, lack of sufficient rigidity of the reflective insulating and casing sheets of the insulating units, and lack of sturdiness of joints between panels or sections of insulation.

A still further reason for failure of certain other reflective insulations has been that provision has not been made for locking the joints of adjacent insulating units together, with the result that they open up and cause excessive heat loss in service.

An object of the present invention is to provide an all-metal thermal insulation structure having hitherto unobtainable ruggedness, durability, lightweight, and high efficiency performance, which may be constructed and assembled at moderate cost with no dust, cement, broken refractory or similar mess involved in the use of the product.

A further object of the invention is to provide prefabricated self contained insulating units complete with weatherproof case and means for securing the units in place, the units to be of such size and construction as to be readily handled, facilitating ease of installation or removal or replacement.

A further object of the invention is to provide a thermal insulation structure incapable of deterioration or becoming defective after prolonged exposures to severe service temperatures, or from expansion movements in service, which will be highly weather resistant, fireproof, as well as bacteria-proof and vermin-proof.

A still further object of the invention is to provide insulation of prefabricated type for hot and cold service requiring no special tools or skill for installation, composed of segments or panels entirely self contained, which may be assembled in proper relationship with respect to one another much more rapidly than other types heretofore proposed and which may with equal ease and facility be removed as occasion demands.

With the foregoing objects in view, together with others which will appear as the description proceeds, the invention resides in the novel construction, combination and arrangement of parts, all as will be described more fully hereinafter, illustrated in the drawings and particularly pointed out in the claims.

In the drawings:

Fig. 1 is a perspective view illustrating in outline one form of my improved insulating structure as applied to a pipe, Fig. 1A is a similar view disclosing a slight modification, Fig. 1B is a detail sectional view taken through the outer casing or shell of the modified form of Fig. 1A and illustrating releasable means for holding the shell or wrapper sheet in closed position, Fig. 1C is a detail sectional view taken through a part of the casing or outer shell and illustrating an alternate means whereby the shell sections may be releasably locked together, Fig. 2 is a perspective view showing more in detail one of the improved units of the pipe covering and disclosing the means for maintaining a plurality of heat reflective metal sheets in proper assembled relationship surrounding the pipe, Fig. 3 is a perspective view of a portion of one end of a part of the unit shown in Fig. 2 and on an enlarged scale to show construction details, Fig. 4 is a perspective view of a half of a split disk used in the assembly of a form of my invention, Fig. 5 is a fragmentary perspective view showing an assembly design of split disk slightly modified from the structure shown by Fig. 4, Fig. 5A is a detail sectional view taken through the split disk of the type shown in Fig. 5 and disclosing structure employed to limit heat loss, Fig. 5B is a similar view showing a further modification, Fig. 6 is a fragmentary sectional view through the longitudinal axis of a pipe insulation unit disclosing a fabrication detail for attaching the split disks to the outer case by means of lock seams, Fig. 6A is a fragmentary sectional view showing an enlarged detail of one means developed for limiting the heat flow from the split disks to the outer case in Fig. 6, Fig. 6B is a similar view showing a further modification of such connection, Fig. 6C is a similar view of a further alternate construction, Fig. 6D is an end elevation of the split disk portion shown in Fig. 6C, Fig. 6E is a fragmentary sectional view of a further alternate construction to Fig. 6A, Fig. 7 is a perspective view of a curved surface insulation segment or panel in the form it may assume in those instances where larger pipe or other curved surfaces are to be insulated that require more than a pair of enclosing segments to surround the surface being insulated, Fig. 8 is a fragmentary longitudinal sectional view of the device shown in Fig. 7 and showing an alternate construction wherein a gasket is inserted between the inner sheets and the split disk, Fig. 9 is a fragmentary transverse sectional view showing the manner in which meeting edges of insulating sheets come together, Fig. 10 is a plan view showing the same inventive idea carried out in flat surface insulation, Fig. 11 is a side elevation of the structure shown in Fig. 10, Fig. 12 is an enlarged detail sectional view taken substantially upon line 12—12 looking in the direction of the arrows, Fig. 13 is a sectional view taken substantially upon line 13—13 of Fig. 12, Fig. 14 is a sectional view taken substantially upon line 14—14 of Fig. 13, Fig. 15 is a plan view of the panel frame, Fig. 16 is a side elevation of the said frame.

Fig. 17 is an enlarged detail sectional view taken through a corner of the frame, and illustrating the use of a gasket in lieu of beading panel frame, Fig. 18 is a fragmentary plan view of a half section of pipe insulation or segment of curved surface insulation, showing intermediate sheet support for units of extra length, Fig. 19 is an enlarged fragmentary sectional view showing the intermediate support clip shown in Fig. 17, Fig. 20 is an enlarged fragmentary plan view disclosing the support clip, and Fig. 21 is a fragmentary plan view of a half section or segment of curved surface insulation and showing an intermediate split disk support.

As will appear more fully hereinafter, heat insulation is normally used to insulate a surface having a temperature above the dewpoint of the surrounding atmosphere, whereas, cold insulation is normally used to insulate a surface having a temperature below the dewpoint. This invention is designed for heat, cold or both heat and cold insulation. When used for cold, the external casing joints are sealed in a conventional manner to prevent moisture infiltration. In referring to prefabricated units as involved in this invention, reference is made to prefabricated assembly of parts of each unit either at the source of manufacture or at the point of use, before mounting the unit on a surface to be insulated. One unit or panel of the various forms of insulation in the present invention may embody the use of a single sheet of heat reflective metal enclosing the surface being insulated, or a plurality of such sheets depending on the insulation efficiency desired. These heat reflective metal sheets of a desired thickness are composed of aluminum, aluminum alloy, zinc alloy, stainless steel, or any metal having the property of high heat reflectivity and of self-sustaining character.

For heat or cold insulation, I employ support sheets of thin stainless steel to support and space the metal insulating sheets arranged transverse thereto. Such a support sheet has a thermal conductivity of roughly one hundred or more times that of non-conductor or insulator type materials. However, it also has an even greater ratio of strength, toughness, and durability when exposed to heat. My design provides essential reinforcement for the thin support sheet and provides other features of construction herein described to limit the flow of heat through it.

For either heat or cold insulation, the very thin support sheets just described, are made into certain parts of the insulating structure which are referred to in the following as heads, diaphragms, or split disks in the case of pipe or curved surface insulation, and as panel frame and channel spacers in the case of flat panel insulation.

Referring now more particularly to the drawings, Figs. 1 to 14 inclusive and Figs. 18 to 21 inclusive, disclose my improved insulation structures applied to the insulation of pipes or curved surfaces represented at 25. As shown, particularly in Fig. 1, the insulating structure is formed in linear units fully enclosing the pipe and connected together end to end throughout the length of the tubular surface to be insulated.

A preferred embodiment of the invention resides in these insulating units made of desired lengths and in halves to be assembled upon opposite sides of the pipe so as to fully enclose and to embrace the latter. One of these sections is well illustrated in Figs. 2, 3, 4 and 6, wherein elongated sheets of heat reflective metal of the gages above suggested are bent or shaped longitudinally into semi-circular form, the said sheets being indicated generally at 26. These sheets will be assembled together in a unitary structure so as to be spaced and concentric with one another as well as with the pipe to be insulated. In the present instance, three of the heat reflective insulating sheets 26 are employed in the unit and an additional wrapper or outer sheet 27 defines the outer surface of the unit. These sheets are secured together in semi-circular, support diaphragms 28, the details of which are shown particularly in Figs. 3 and 4. Each of these diaphragms is formed of heat conductor material is of a size to properly accommodate and support the ends of the insulating sheets 26 as well as the wrapper sheet 27. The said insulating sheets having their ends engaged in the slots 29 formed in an inwardly directed flange 30 integral with the diaphragm 28. It will be observed that the flanges 30 are disposed radially of the unit and the slots 29 are spaced apart a distance to maintain the heat reflective insulator sheets at all times in proper spaced relationship. The outer edges of the diaphragm 28 are provided with inwardly directed securing flanges 37 to be secured as by rivets 38 or other suitable fasteners to the wrapper sheet 27, thereby holding the entire assembly of sheets and heads together as a unit. The insulating sheets 26 are reinforced by forming their longitudinal edges 31 into the double-bend, double flange shoulder illustrated, and the underlying longitudinal edges of the outer case 27 are reinforced in this same manner or by the alternate double flange hem, as illustrated. If desired, additional spacer members for these heat reflective insulation sheets may be employed as indicated by dotted lines at 32 in Fig. 3 of the drawings. In this instance, the spacing members will be formed of relatively thin heat conductor material or metal bent into right angular shape and riveted or secured as at 33 in proper radial relationship upon the inner surface of the diaphragm 28. The diaphragm 28 is provided with a semi-circular cut-away portion 34 slightly in excess of the diameter of the pipe which is to be insulated, and an inwardly directed flange 35 projects from the arcuate opening 34 to provide a line contact 36 with the outer surface of the pipe or curved surface to be insulated. An important feature of the diaphragm design heretofore described is that the inner sheet support flange 30, the inner collar 35, and the outer flange or rim 37 each form an angle which is not 90° with the diaphragm 28, so that the contact between adjacent parts of the insulation unit and with the pipe are essentially lined contacts, and the heat loss by conduction through the insulation parts is greatly restricted thereby.

As shown particularly in Figs. 1 and 2 of the drawings, the upper segment of the insulating shell or unit is provided at its sides with an extending lip 39 to overlie the adjacent edge of the wrapper sheet or cover 27 of the companion unit in order that the two halves will be brought together tightly in assembled relationship with the arcuate channels 26 between the heat reflective sheets communicating with one another. The units are assembled upon the pipe to be insulated in the manner shown, with one end of each unit provided with an overhang or flange 40 to fit over in tight engagement with the butt end of the next adjoining unit. The overhang 40 may be provided with a securing pin 41 to engage in a corresponding opening 42 in the surface of the underlying section. Other means may be employed for securing the units in proper assembled relationship upon the pipe or conduit to be insulated. In Fig. 1 of the drawings, annular bands 43 may be applied at intervals along the lengths of the sections in order to secure the sections to the surface being insulated.

In Fig. 1A of the drawings, there is illustrated an important modification, wherein the sections of the units as above described may be hingedly connected as at 44 along one edge and provided at the opposite edges with spring-loaded lock means 45 as illustrated in Fig. 1B of the drawing. In this view it is obvious that the spring pressed ball 46 is forced in an outward direction to engage within a hole 47 in the overlying edge of the companion section. By constructing the units in this manner it is apparent that they may be quickly and easily applied to the pipe to be insulated in interfitting relationship and secured by the end lock pins and spring-loaded edge locks described and shown.

Fig. 1C shows an alternate means to that shown in Fig. 1B for securing the edges of insulating elements or panels together. The means illustrated consists of a commercial spring loaded catch 45a mounted externally on the outer case, which provides for drawing and locking together of adjacent units.

In some instances, particularly units of smaller diameter, only a pair of liner sheet spacers or flanges 30 need be employed at each end of a unit, while in other instances where larger diameters are encountered it may be deemed advisable to add the clips 32 as shown in Figs. 2 and 3 of the drawings. It will be understood that the curved insulation sheets by the means described, are held at all times in proper spaced relationship to provide the insulating channels, and at the same time their mounting in the manner described permits of any expansion or contraction that may occur when heated or cold atmospheres are encountered without danger of distortion of the sheets or interfering with their insulating capabilities. It will also be observed that the specific arrangement of the flange 35 at each end of each unit brings about an edge contact between the flange and the pipe being insulated. This limited contact enhances the insulating characteristics of the units, as it will be apparent that line contact thus provided materially restricts the possibility of transfer of heat by conduction through the head sections.

In Fig. 5 of the drawing there is illustrated a slight modification of the diaphragm section, wherein a separate inner angle rim 48 is attached as by rivets or other fastening devices 49 to the split disk or diaphragm member 50, the said angle member taking the place of the inturned flange 35 heretofore described. Similarly, the support and spacing clip 51 is formed as a separate piece of angle formation and secured as by rivets as shown to the diaphragm 50. An outer angle rim 52 is secured to the outer periphery of the diaphragm and to which the outer case or wrapper sheet is to be attached, as in Fig. 3 with fasteners 38.

Fig. 5A is a cross section detail disclosing how the angle members 48, 51 and 52 may be secured to the diaphragm 50 to reduce to a satisfactory value the heat transferred by conduction through the support disk assembly from the collar to the outer case or vice versa. In this instance, the diaphragm 50 will be provided upon its inner face with a sufficient number of protuberances 53 of limited area to act as spacing members to hold the diaphragm 50 in contact with the several angle members only through the small raised metal extrusions, plus the conduction through the fasteners 49 themselves.

Fig. 5B is a cross sectional view of a further modification of Fig. 5, wherein an alternate method of attaching the angular collar or flange 48, support clip 51 and angle rim 52 is utilized. In this development, direct conduction through the parts connected to the head is restricted by the use of a suitable non-conductor gasket 53'.

Fig. 6 shows a sectional view through a pipe insulation unit similar to Fig. 2, disclosing a fabrication detail for securing the split disks or diaphragms 28 to the outer case or wrapper sheets by means of a full lock seam 54 formed in the wrapper sheet at the butt end, and by means of a partial lock seam 55 at the socket end of the unit. It will be observed that suitable fasteners 56 through the partial lock seam are used to secure the diaphragm in position at this end of the unit.

Fig. 6A shows an enlarged detail of one form of the invention, revealing the method used to isolate the split disk or diaphragm 28 from the outer case or wrapper sheet 27. In this instance, those surfaces of the head or split disk confined within the wrap of the shell 27 will be provided with spaced protuberances of small area 59 to afford limited contact between the diaphragm and the adjacent surfaces of the wrapper sheet 27.

Fig. 6B is a modification wherein the diaphragm 28 may be provided with beads 60 in spaced relationship to provide limited contact surfaces between the diaphragm and the adjacent surfaces of the wrapper sheet.

Fig. 6C shows a further modification wherein a double crimped construction is employed to isolate the split disk from the outer case or wrapper sheet. This double crimp is indicated at 61 and is more clearly disclosed in the fragmentary elevation 6D.

Figure 10:
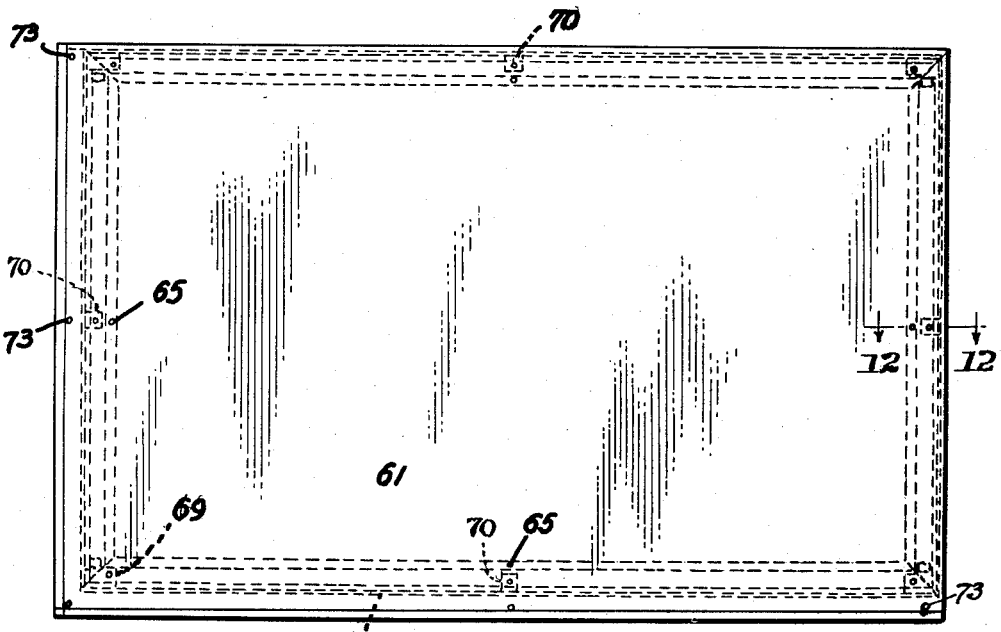
Figure 11:
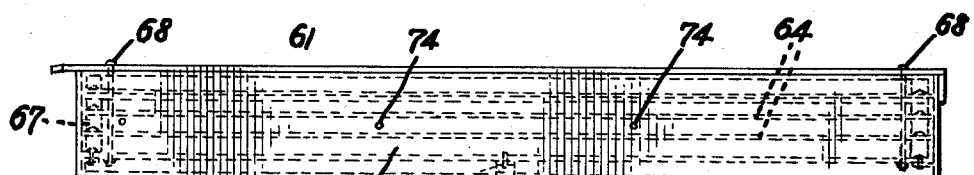

Fig. 6E shows a further modification of the connection between the diaphragm 28 and the outer or wrapper sheet 27, a non-conductor insulating tape 57 being interposed between the engaging parts of these elements to limit the heat flow by conduction.

Fig. 7 of the drawings illustrates a curved surface insulating panel or segment to be employed in instances where the pipe or curved surface to be insulated is of substantial diameter, or where more than two insulating unit segments would prove the more practical in surrounding the surface to be insulated. In this embodiment of the invention each of the panels is disclosed as having three spaced heat reflective sheets in addition to the cover or wrapper sheet, and the same are held in proper spaced relationship by the diaphragms through support flanges and spacer clips as shown. The longitudinal edge of one of the units is provided with spaced openings or holes 41b to receive locking pins or screws 41a carried by or inserted through the corresponding or overlying edge of the next adjacent panel.

In this insulation design for pipes and curved surfaces it is to be noted that the mating reenforced longitudinal flanges of the inner sheets abut each other as flat surfaces firmly held in place so that air leakage from the hot isolated air spaces to the colder isolated air spaces throughout the length of the unit is prevented. Moreover, the flange reenforcement provided prevents gapping of these joints between end supports, as occurs without such reenforcement with light gage inner sheets which are economical in cost. Each inner sheet by the method here described and illustrated is free to expand or contract radially between the reenforced longitudinal flanges. For heat insulation, end clearance is provided as needed between the inner sheets and the heads or support diaphragms to permit free longitudinal expansion and contraction. Where greater overall insulation unit strength is desired beyond that heretofore described, the inner case is secured to the sheet support flange 30 on the split disk or diaphragm at each end of an insulating element by means of suitable fasteners such as pin or rivet 31a.

In Fig. 8 of the drawing, there is illustrated a further modification wherein a non-conducting gasket 60, conforming in general shape to that of the diaphragms, is interposed between the inner surface of the diaphragm and the ends of the longitudinally disposed heat reflective sheets in order to provide for instances where a gasket may be preferred in this location to the sheet end clearance previously described.

Fig. 9 of the drawing is a fragmentary transverse sectional view taken through a pipe 25 and illustrating how the wrapper sheets or covers 27 of each section are arranged in overlapping relationship, also the manner in which the longitudinal flanged edges of the spaced heat reflective sheets abut with one another when the sections are assembled together in proper relationship. It will be observed from this view that the space channels thus provided within the sections communicating with corresponding space channels of the cooperating sections, but no transverse communication between such channels is possible. It is therefore seen that the spaces between the heat reflective sheets 26—27 are dead air spaces to afford a maximum of insulation.

Figs. 10 to 17 inclusive show the same inventive idea carried out as flat surface insulation. This insulating unit may be referred to as a flat panel, composed of a plurality of heat reflective thin metal insulating sheets including an outer case 61, an inner case 62, a panel frame 63 and a plurality of inner liners 64 maintained in spaced parallelism within the panel to provide the spaced insulating pockets or channels extending the full length and breadth of the panel. The outer case 61 is attached to the top flange of the frame 63 by suitable fasteners 65, and it will be observed that the edges of the outer case are provided with downturned flanges 66 to overlie the frame 63 and reenforce the outer case. It will be observed that the panel frame 63 completely encloses the inner liner sheets 64 and the inner case 62, the said sheets 64 being spaced or separated from each other by channel spacers indicated at 67 at the periphery of each sheet. These spacers are held in parallel alignment with the outer case 61 by means of a pin 68 passing through suitable openings provided in the outer case, inner case and in the channel spacers 67. These pins sandwich the sheets and channels firmly together and assist in maintaining a rigid assembly. The lower ends of these pins 8 pass through position gages 69 disposed in each bottom corner of the panel frame 63. To provide for internal expansion and contraction, the inner sheets 64 and 62 are so cut as to provide edge clearance between each sheet and the inside surface of the panel frame as shown more particularly in Fig. 12 of the drawings. The inner case 62 is further secured to the frame 63 by spring angle clips 70 and fasteners 71, the outer end of each of said clips being enclosed in the bead 72 at the lower end of the frame 63. Holes 73 are provided along the lap extensions of the outer case 61 for the insertion of installation fasteners (not shown), such as sheet metal screws. The sides of the panel frame may also be provided with knock-out holes 74 to enable wires to be inserted in the holes thus provided and the unit secured to lugs, rods or other means of attachment on the surface being insulated.

Figure 12:
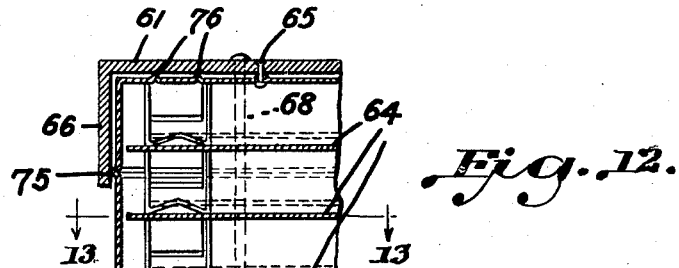

The detail view Fig. 12 also illustrates the means here employed of limiting heat flow between high conductivity metal parts, by restricting the contact between such parts to substantially line contact, plus the minute contact through small fasteners. A single continuous bead 75 is formed on the side and end faces of the panel frame 63 to engage the depending flange 66 of the outer case, and double continuous beads 76 are formed on all top flanges of the panel frame to provide said line contact, structural support, and convection seal between these parts. This same construction of line contact, support, and seal is used for the channel spacers 67 which are constructed in a W form, as shown, and serve these functions with respect to the inner case 62, insulating sheets 64, and top flange of frame 63.

Figs. 13 and 14 show one course of the special formed end channel and side channel spacers, showing in particular the fin-type corner lock 67a between channels, while Figs. 15 and 16 are top plan and side elevation views respectively of the panel frame. Fig. 17 is an enlarged fragmentary sectional view taken through one corner of the panel frame and illustrating the use of a gasket 77 interposed between the outer case and the panel frame 63 in lieu of the beading heretofore described. This view also illustrates the hem or bead 72 at the lower end of the side section of frame 63.

Figure 18:
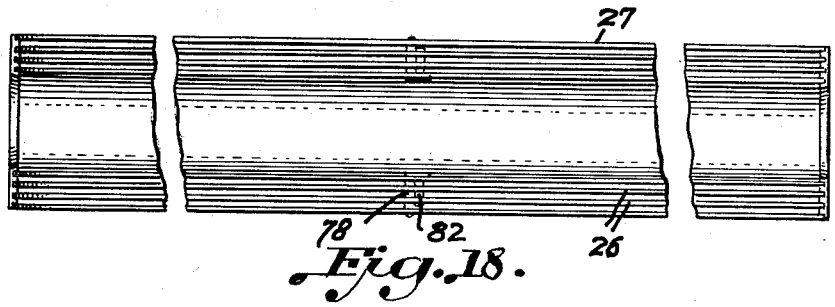
Figure 19:
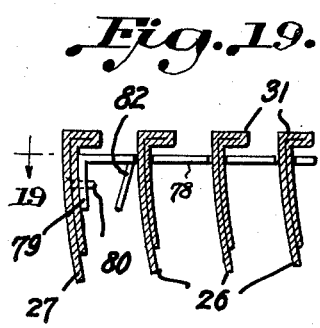
Figure 20:
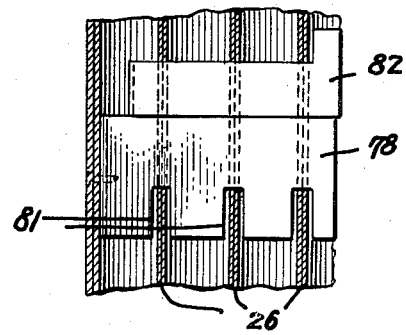

Fig. 18 is a longitudinal sectional view through a half section of pipe insulation or segment of a curved surface insulation of abnormal length, showing intermediate sheet supports for the spaced reflective insulation sheets. This means, illustrated further in the fragmentary sectional and plan views Figs. 19 and 20, comprises an intermediate support clip 78 of suitable metal having an angular flange 79 at one end to be secured by screws or other securing elements 80 to the inner surface of the outer shell or cover sheet 27. This support clip 78 is provided in one of its longitudinal edges with spaced recesses 81 to receive the edges of the reflective sheets 26, the slots or recesses 81 being spaced apart such distance as to maintain the sheets 26 properly spaced from one another at all times. A clip lock-bar 82 may be used as shown, to lock the support clip 78 in mesh with the insulating sheets 26 and hold it in position for installing the fastener 80.

Figure 21:
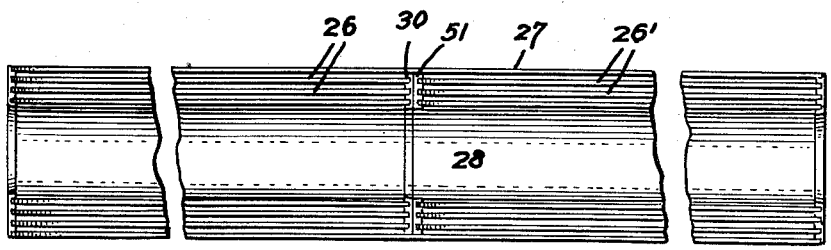

Fig. 21 is a longitudinal sectional view through a half section of pipe insulation or a segment of a curved surface insulation of abnormal length. This insulation unit is comprised of a single outer case 27, a head at each end of construction previously described, and two clusters of inner sheets 26 and 26' which are supported at their inner ends by a modified support diaphragm. This intermediate support diaphragm may be identical to that previously shown in Fig. 4 with the addition of support flanges 51, as previously shown in Fig. 5, mounted in opposed position to the support flanges 30, and secured to the diaphragm 28 by rivets or other suitable means.

In all the designs covered by this invention, the outer case normally is a heat reflective metal insulating sheet, but in special instances it may consist of any other metal or plastic in order to meet corrosive or other unusual conditions. Outstanding advantages of the invention are that it offers to industry a thermal insulation product fabricated in units for rapid low cost installation on pipes, curved surfaces and flat surfaces, and the units may be available in all metal construction to offer a product of hitherto unobtainable ruggedness, durability, lightweight, high efficiency performance, weather resistance, and thermal shock resistance, at moderate cost. The manner in which these units are constructed and assembled produces great tensile strength, and enables the units to be applied to the surface to be insulated by simple methods, thus economizing time and cost of field installation without the sacrifice of ruggedness or insulation efficiency. Moreover, the manner in which the various sections are secured together, both transversely as well as longitudinally of the surface to be insulated, insures positive locking of all joints in such manner as to minimize the opportunity for heat loss at the joints.

I claim:

1. In a thermal insulation structure, a self contained unit mounted upon the structure to be insulated, comprising a pair of spaced support diaphragms of heat conducting material constituting the ends of said unit and resting upon the surface to be insulated, a flange of thin conducting material disposed transversely upon the inner face of each diaphragm with its surfaces disposed at substantially right angles to the surface to be insulated, said flange having spaced parallel recesses extending inwardly from the free edges of said flanges providing spaced fingers between said recesses, the flanges and recesses of one diaphragm being aligned with the flanges and recesses of the other diaphragm, insulating sheets extending from one of said diaphragms to the other with their ends disposed in the aligned recesses and limited to line contact with said fingers, and means for securing said unit in assembled relationship upon the surface to be insulated.

2. In a thermal insulation structure, a self contained unit mounted in enclosing relationship upon the structure to be insulated comprising support diaphragms of heat conducting material arranged in spaced parallel relationship upon and supported by line contact upon the body to be insulated and disposed at substantially right angles to the surface of said body, a flange on the inner face of one diaphragm extending at an angle thereto toward a like flange on the other diaphragm, the said flanges having parallel recesses extending inwardly from their free edges, the said recesses of the opposed flanges being aligned with one another, insulating sheets extending from one diaphragm to the other with their ends loosely engaged in said aligned recesses, and means for securing said unit in assembled relationship upon the body to be insulated.

3. In a thermal insulation structure for cylindrical bodies, a pair of spaced and opposed support diaphragms of heat conducting material arranged in spaced parallel supporting relationship upon said body at substantially right angles thereto with their inner edges conforming to the shape thereof and resting upon said body in line contact therewith, a flange projecting transversely from the interior face of each diaphragm at an angle thereto, the flanges of the opposed diaphragms being aligned with one another, said flanges having spaced recesses extending inwardly from their free edges to provide supporting fingers, the recesses of said flanges being aligned with one another, insulating sheets extending from one of said diaphragms to the other with their ends disposed in said recesses and the surfaces of said sheet ends engageable with the edges of said fingers, and means for securing said unit in assembled relationship upon the body to be insulated.

4. In a thermal insulation structure for curved bodies, a pair of relatively thin support diaphragms of heat conducting material cut away at their inner edges to conform to the curvature of the body and resting upon the same by line contact and disposed at substantially right angles to the body in spaced parallelism with each other, a row of spaced fingers on the interior face of each diaphragm disposed at an angle to the diaphragm and extending transversely thereof, the spaces between the fingers of one diaphragm being in alignment with like spaces on the other diaphragm, insulating sheets extending from one to the other of said diaphragms with their ends disposed in said spaces with said ends limited to line contact with the edges of said fingers, and means for securing said diaphragms and sheets supported thereby in assembled relationship on said body.

5. A thermal insulation structure for cylindrical bodies, comprising thin heat conducting segmental sustaining diaphragm members arranged in pairs, each pair encircling the body to be insulated and each said pair being in spaced and opposed parallel relationship upon the body and at substantially right angles thereto, said members being cut away on their inner edges to conform with the shape of the body and to rest upon the same in line contact, radial flanges on the interior faces of said members disposed at substantially right angles to the body being insulated, said flanges extending from the outer to the inner edges of said members and having spaced parallel recesses extending inwardly from their free edges to provide a plurality of spaced apart fingers, the recesses of one pair of members in alignment with the recesses of the other pair, insulating sheets extending from one pair of said members to the other with their ends disposed in said aligned recesses with said ends limited to line contact with said fingers, and a wrapper sheet enclosing the structure and extending from one pair of diaphragms to the other and holding the same in fixed position upon said body.

6. A thermal insulation structure for cylindrical bodies, comprising thin heat conducting segmental sustaining diaphragm members arranged in pairs, each pair encircling the body to be insulated and each said pair being in spaced and opposed parallel relationship upon the body and at substantially right angles thereto, said members being cut away on their inner edges to conform with the shape of the body and to engage the same in line contact, a rim flange on the outer edge of each diaphragm projecting inwardly therefrom at an angle to said diaphragm, radial flanges on the interior faces of said members disposed at substantially right angles to the body being insulated, said flanges extending from the outer to the inner edges of said members and having spaced parallel recesses extending inwardly from their free edges to provide a plurality of spaced fingers, the recesses of one pair of members in alignment with the recesses of the opposite pair, insulating sheets extending from one pair of said members to the other with their ends disposed in the said aligned recesses and which ends are limited to line contact with the edges of said fingers, a wrapper sheet enclosing the structure and extending from one pair of diaphragms to the other having its ends overlapping said rim flanges, the angularity of said rim flanges being such as to bring about line contact between said rim flanges and said wrapper sheet, and means for securing said wrapper sheet to said rim flanges.

7. In a thermal insulation structure, a self contained unit mounted in enclosing relationship upon the structure to be insulated comprising support diaphragms of heat conducting material arranged in spaced parallel relationship upon and supported by line contact upon the body to be insulated and disposed at substantially right angles to the surface of said body, a flange on the inner face of one diaphragm extending at an angle thereto toward a like flange on the other diaphragm, the said flanges having parallel recesses extending inwardly from their free edges, the said recesses of the opposed flanges being aligned with one another, insulating sheets extending from one diaphragm to the other with their ends disposed in said aligned recesses, the thickness of said sheet ends being less than the breadth of said recesses to permit expansion or contraction due to temperature changes, and means for securing said unit in assembled relationship upon the body to be insulated.

References Cited in the file of this patent

UNITED STATES PATENTS

| | | |
|---|---|---|
| 534,473 | Harvey | Feb. 19, 1895 |
| 926,423 | Kelly | June 29, 1909 |
| 1,340,332 | Fitzpatrick | May 18, 1920 |
| 2,050,663 | Legrand | Aug. 11, 1936 |
| 2,078,606 | Legrand | Apr. 27, 1937 |
| 2,578,600 | Rose | Dec. 11, 1951 |
| 2,613,166 | Gronemeyer | Oct. 7, 1952 |

FOREIGN PATENTS

| | | |
|---|---|---|
| 508,731 | Germany | Oct. 1, 1930 |